United States Patent [19]

Gargini

[11] 4,200,839

[45] Apr. 29, 1980

[54] WIRED TELEVISION BROADCASTING SYSTEMS

[76] Inventor: Eric J. Gargini, 72 Fairway Ave., West Drayton, Middlesex, England

[21] Appl. No.: 909,845

[22] Filed: May 26, 1978

Related U.S. Application Data

[63] Continuation-in-part of Ser. No. 736,410, Oct. 28, 1976, abandoned.

[30] Foreign Application Priority Data

Oct. 29, 1975 [GB] United Kingdom ............... 44500/75

[51] Int. Cl.$^2$ ........................... H04B 3/50; H04N 7/16
[52] U.S. Cl. ........................................... 455/3; 358/86
[58] Field of Search ................... 358/86; 325/308, 53, 325/309

[56] References Cited

U.S. PATENT DOCUMENTS

| | | | |
|---|---|---|---|
| 3,280,249 | 10/1966 | Gargini | 358/86 |
| 3,594,496 | 7/1971 | Parton | 358/86 |
| 3,639,840 | 2/1972 | Shekel et al. | 325/308 |
| 3,665,316 | 5/1972 | Jeffers | 325/308 |
| 3,898,566 | 8/1975 | Switzer et al. | 325/308 |

FOREIGN PATENT DOCUMENTS 1179592  1/1970  United Kingdom ...................... 358/86

*Primary Examiner*—Marc E. Bookbinder

[57] ABSTRACT

A wired television broadcasting system is disclosed in which a plurality of programme signals are made available on separate conductive paths to each of a plurality of programme selectors controllable by respective subscribers to the system, the conductive paths defining channels. In order to reduce cross-view coupling, the channels are arranged in one or more groups divided into a plurality of pairs of channels, each channel operating at the same nominal carrier frequency with the two channels of each said pair operating at carrier frequencies offset relative to each other by an odd integral multiple of half the line frequency, and the phase of the carriers on the two channels of any one said pair being the same with the phase of any two pairs in the group differing by an integral multiple of 90°.

4 Claims, 3 Drawing Figures

WIRED TELEVISION BROADCASTING SYSTEMS

This is a continuation-in-part application to application Ser. No. 736,410, filed Oct. 28, 1976, now abandoned.

The present invention relates to wired television broadcasting systems, and in particular to wired television broadcasting systems in which any one of a plurality of subscribers may selectively connect his television receiver to any one of a plurality of separate conductive paths defining separate television programme channels.

Wired broadcasting systems are known in which programmes are made available at a central exchange to which a plurality of subscribers are connected by respective signal conductors. Each subscriber is provided with means for controlling a selector specific thereto located at the exchange for selecting a desired programme for application to his signal conductors. Such a system is disclosed in our British Pat. No. 1,272,594. Systems are also known in which programme signals are made available on separate conductive paths extending to each subscriber's premises, each subscriber's television receiver being provided with a selector for connecting the receiver to a desired one of the conductive paths.

In systems such as those described above, cross-view coupling can occur between separate channels. The effects of cross-view coupling are however generally mitigated by random frequency and phase relationships which occur in actual installations. For example in a practical system of the type described in British Pat. No. 1,272,594 two groups of carriers are derived from respective high stability crystal oscillators which are operated in precision offset. Each oscillator feeds a "tree" of hybrid transformers to provide one carrier wave outlet in respect of each programme which is to be made available. The carrier waves from these outlets are applied to modulators or to automatic frequency control inputs of special off-air receivers. If no attention is paid to the polarity of the windings and wiring-up of the various hybrids and other radio frequency transformers which are provided, and if no particular relationship is observed between the programme channels and the two carrier wave oscillators, the random frequency and phase relationships which result reduce the cross-view coupling between separate channels. This is not entirely satisfactory however as the cross-view protection is not as good as it could be nor wholly predictable.

It is an object of the present invention to improve cross-view protection in wired television broadcasting systems.

According to the present invention, there is provided a multiple channel wired television broadcasting system for making a plurality of programme signals with a preselected line frequency characteristic available on separate conductive paths to each of a plurality of programme selectors controllable by respective subscribers to the system, means arranging the conductive paths defining channels in two groups of channels, means providing a first one of said two groups of channels a first operating carrier frequency and the second of said two groups of channels a second carrier frequency offset by an odd integral multiple of half line frequency to the first, means establishing said carriers of each said group of channels in quadrature or in phase opposition to each other, and means allocating the channels to respective conductive paths arranged in pairs of adjacent conductive paths such that one conductive path of each pair operates at said first carrier frequency and the other conductive path operates at said second carrier frequency.

It will be appreciated that the required phase difference of an integral multiple of 90° between the pairs in a group precludes there being more than four pairs in any one group, the four pairs having relative phases of 0°, 90°, 180° and 270°.

An embodiment of the present invention will now be described, by way of example, with reference to the accompanying drawings, in which.

Figure 1:
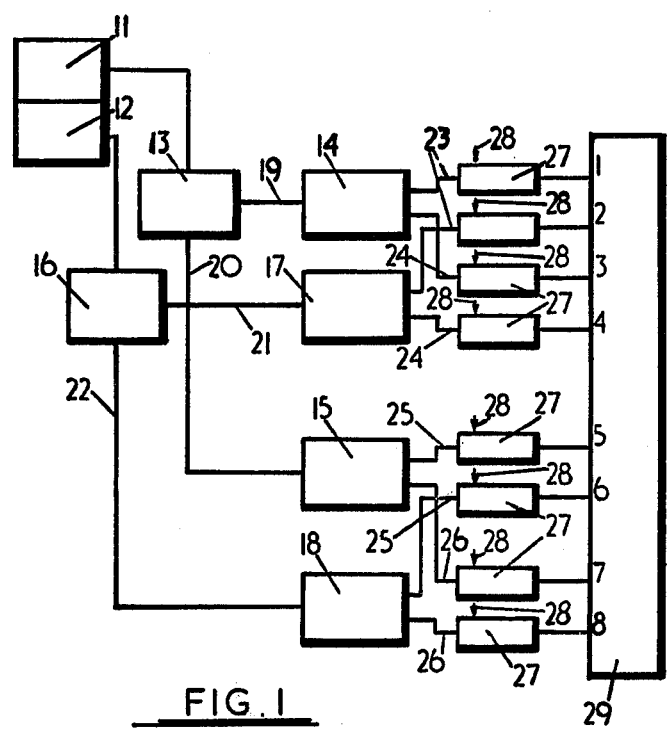
FIG. 1 illustrates the arrangement of one group of eight channels in a thirty six channel system.

In the illustrated system thirty six television programme signals are made available at an exchange and applied in the exchange to a plurality of thirty six terminal selector switches. FIG. 1 illustrates the exchange circuitry and switches which handle the first eight of these programme signals, the remaining programme signals being handled in a like manner. Each switch is connected by an individual conductive path 6 to a respective subscriber 7 to the system 8, and each subscriber is provided with means 9 for controlling his selector switch. One way in which the necessary subscriber/switch connections and controls can be achieved is described in the afore-mentioned British Pat. No. 1,272,594 the content of which is incorporated herein by reference.

Referring to FIG. 1 two high stability crystal oscillators 11 and 12 operate in precision offset, the nominal frequency of each oscillator being for example 8.9 MHz and the offset being one half line frequency. The oscillators 11, 12 feed respective "trees" of phase shifters. Each "tree" comprises three phase shifters which together handle four programme signal channels. The first of the two "trees" shown comprises a 180° phase shifter 13 and two 90° phase shifters 14, 15 and the second comprises a 180° phase shifter 16 and two 90° phase shifters 17, 18.

Taking the outputs of the oscillators 11 and 12 to be at phase 0°, the phase shifter 13 provides a 0° output 19 to phase shifter 14 and a 180° output 20 to phase shifter 15. The phase shifter 16 provides a 0° output 21 to phase shifter 17 and a 180° output 22 to phase shifter 18. The phase shifter 14, 15, 17 and 18 each provide outputs the phases of which are respectively +45° and −45° relative to their inputs. Thus phase shifters 14 and 17 provide −45° outputs 23 and +45° outputs 24, and phase shifters 15 and 18 provide 135° outputs 25 and 225° outputs 26.

The outputs 23, 24, 25, and 26 are applied to a series of eight modulators 27 each of which receives a respective programme signal 28 at video. The modulators 27 supply carrier signals modulated with respective programme signals 28 to the busbars of a switching network 29 that are dedicated to channels 1 to 8 as shown. The switching network 29 comprises switches adapted to connect a respective subscribers outlet to any one of the busbars. Suitable switching systems are well known, and will therefore not be described in detail herein.

The carriers of the system shown in FIG. 1 have relative phase differences of 0°, 90°, 180° and 270° and frequencies which are relatively either high or low in accordance with the following sequence:

| CHANNEL | RELATIVE PHASE | RELATIVE FREQUENCY |
|---|---|---|
| 1 | 0 | High |
| 2 | 0 | Low |
| 3 | 90 | High |
| 4 | 90 | Low |
| 5 | 180 | High |
| 6 | 180 | Low |
| 7 | 270 | High |
| 8 | 270 | Low |

Where more than eight channels are provided, the above sequence repeats itself every eight channels, viz:

| CHANNEL | RELATIVE PHASE | RELATIVE FREQUENCY |
|---|---|---|
| 9 | 0 | High |
| 10 | 0 | Low |
| 11 | 90 | High |
| 12 | 90 | Low | and so on.

The eight channels 1 to 8 from two groups a first one of which (channels 1, 3, 5 and 7) operates at a high relative frequency and the second of which (channels 2, 4, 6 and 8) operates at a low relative frequency. The carriers of each group are placed in quadrature or in phase opposition to each other. The channels are allotted to respective conductive paths arranged in pairs (1 and 2, 3 and 4, 5 and 6, 7 and 8) of adjacent conductive paths. As a result one conductive path of each pair operates at the high relative frequency, the other at the low relative frequency.

In systems of the type to which the present invention is applicable, a major component of potential cross-view coupling results from direct switch cross-view to the individual subscribers output line. To illustrate the enhanced cross-view protection afforded by the present invention, this component is analysed below.

In a thirty six channel system, thirty five channels interfere at the switch. Of these (from an extrapolation of the carrier allocation table given above) eighteen channels are in half line frequency offset to the wanted. The eighteen offset channels are placed in quadrature or in phase opposition to each other. The resulting multi-channel residual carrier if for most of the time cancelled by the opposition of the two sets of residual carriers.

The remaining seventeen channels appearing at the switch are synchronized to the wanted channel. Of these four will be substantially in the same phase and four in antiphase to the wanted. The resulting multi-channel residual carrier is for most of the time cancelled by the opposition of the two sets of residual carriers.

The remaining nine channels will be substantially in quadrature with the wanted channel i.e. the 0° or 180° control of phasing ensures that the resulting residual carrier is substantially cancelled and the sideband signals at the output of the switch are in quadrature. The television receiver does not however respond readily to quadrature phased sideband signal components and therefore provides added protection.

Figure 2:
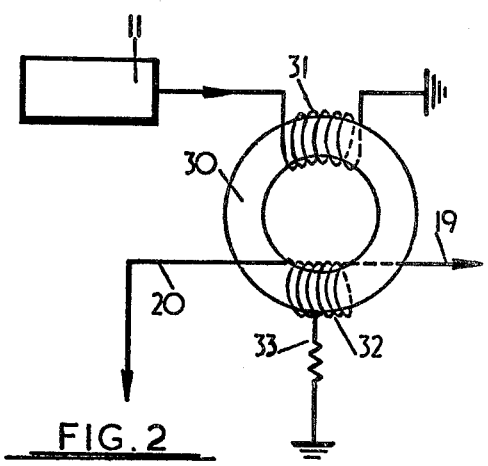
FIG. 2 is a circuit diagram of one of two 180° phase shifters shown in FIG. 1.

Referring now to FIG. 2, the phase shifter 13 of FIG. 1 is illustrated as comprising a core 30 supporting an input winding 31 and an output winding 32. The input winding 31 is connected to the respective oscillator 11 (FIG. 1) and the output winding 32 has a grounded centre tap 33 so as to provide outputs 19 and 20 respectively at 0° and 180° relative to the output of the oscillator 11.

Figure 3:
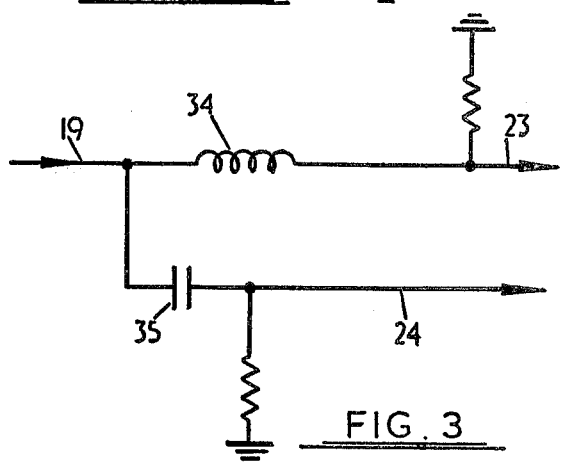
FIG. 3 is a circuit diagram of one of four 90° phase shifters shown in FIG. 1.

Referring now to FIG. 3, the phase shifter 14 is illustrated as comprising an inductance 34 in parallel with a capacitor 35 providing outputs 23 and 24. The reactance of the inductance 34 is the same as that of the capacitor 35, for example 75 ohms at 8.9 MHz.

What is claimed is:

1. In a multiple channel wired television broadcasting system for making a plurality of programme signals with a preselected line frequency characteristic available on separate conductive paths to each of a plurality of programme selectors controllable by respective subscribers to the system, means arranging the conductive paths defining channels in two groups of channels, means providing a first one of said two groups of channels a first operating carrier frequency and the second of said two groups of channels a second carrier frequency offset by an odd integral multiple of half line frequency to the first, means establishing said carriers of each said group of channels in quadrature or in phase opposition to each other, and means allocating the channels to respective conductive paths arranged in pairs of adjacent conductive paths such that one conductive path of each pair operates at said first carrier frequency and the other conductive path operates at said second carrier frequency.

2. A wired broadcasting system according to claim 1, wherein the means providing the first and second carrier frequencies comprises two high stability crystal oscillators arranged to operate in precision offset, the offset being an odd integral multiple of half line frequency, and the means establishing said carriers of each said group of channels in quadrature or in phase opposition to each other comprises respective "trees" of phase shifters fed by said oscillators.

3. A wired broadcasting system according to claim 2, wherein each "tree" of phase shifters provides carriers for four channels and comprises a 180° phase shifter supplying two 90° phase shifters.

4. A wired broadcasting system according to claim 3, wherein the 180° phase shifter comprises a core supporting an output winding having a grounded centre tap, and wherein each 90° phase shifter comprises an inductance connected in parallel with a capacitor.

* * * * *